(12) United States Patent
Ajemian (10) Patent No.: US 10,994,282 B2
(45) Date of Patent: May 4, 2021

(54) ELECTRIC PRECIPITATOR AIR POLLUTION CONTROL DEVICE

(71) Applicant: Robert Charles Ajemian, Sparta, NJ (US)

(72) Inventor: Robert Charles Ajemian, Sparta, NJ (US)

( * ) Notice: Subject to any disclaimer, the term of this patent is extended or adjusted under 35 U.S.C. 154(b) by 284 days.

(21) Appl. No.: 15/886,481

(22) Filed: Feb. 1, 2018

(65) Prior Publication Data

US 2018/0154372 A1 Jun. 7, 2018

Related U.S. Application Data

(63) Continuation-in-part of application No. 15/138,784, filed on Apr. 26, 2016, now Pat. No. 10,710,016, (Continued)

(51) Int. Cl.
*B03C 3/38* (2006.01)
*B03C 3/02* (2006.01)
*B01D 49/00* (2006.01)
*B03C 3/66* (2006.01)
*F24C 15/20* (2006.01)
(Continued)

(52) U.S. Cl.
CPC ............. *B03C 3/38* (2013.01); *B01D 47/028* (2013.01); *B01D 49/00* (2013.01); *B03C 3/011* (2013.01); *B03C 3/014* (2013.01); *B03C 3/019* (2013.01); *B03C 3/02* (2013.01); *B03C 3/12* (2013.01); *B03C 3/16* (2013.01); *B03C 3/41* (2013.01); *B03C 3/47* (2013.01); *B03C 3/53* (2013.01); *B03C 3/66* (2013.01); *B03C 3/78* (2013.01); *F24C 15/20* (2013.01); *F24C 15/2035* (2013.01); *F24C 15/2057* (2013.01); *B03C 2201/00* (2013.01); *B03C 2201/04* (2013.01); *B03C 2201/10* (2013.01)

(58) Field of Classification Search
CPC .... B03C 3/02; B03C 3/12; B03C 3/38; B03C 3/40; B03C 3/41; B03C 3/66; B03C 2201/00; B01D 49/00; F24C 15/20
See application file for complete search history.

(56) References Cited

U.S. PATENT DOCUMENTS 3,242,652 A   3/1966   Malenchini
3,785,124 A   1/1974   Gaylord
(Continued)

FOREIGN PATENT DOCUMENTS

EP   0857508 A1   8/1998

*Primary Examiner* — Sean E Conley
(74) *Attorney, Agent, or Firm* — Gearhart Law LLC (57) ABSTRACT

An electrostatic air precipitator for emission remediation including, a grounded frame connected to a housing having an upstream direction and a downstream direction with a first ionizing section, having at least a first set of ionizing members and a second set of ionizing members, where the ionizing members of the first set and the second set are electrically isolated from each other and electrically isolated from the grounded frame. Also, the ionizing members of the first set and the ionizing members of the second set are powered by separate power supplies and at least a first collector section is located downstream of the first ionizing section, and the first collector section has at least a first plurality of collector plates.

20 Claims, 8 Drawing Sheets

Related U.S. Application Data which is a continuation-in-part of application No. 14/287,632, filed on May 27, 2014, now Pat. No. 9,327,224.

(60) Provisional application No. 62/453,170, filed on Feb. 1, 2017, provisional application No. 61/827,191, filed on May 24, 2013.

(51) Int. Cl.

| | | |
|---|---|---|
| *B03C 3/47* | (2006.01) | |
| *B03C 3/12* | (2006.01) | |
| *B03C 3/014* | (2006.01) | |
| *B03C 3/41* | (2006.01) | |
| *B03C 3/78* | (2006.01) | |
| *B03C 3/16* | (2006.01) | |
| *B03C 3/011* | (2006.01) | |
| *B03C 3/019* | (2006.01) | |
| *B01D 47/02* | (2006.01) | |
| *B03C 3/53* | (2006.01) | |

(56) References Cited

U.S. PATENT DOCUMENTS

| | | |
|---|---|---|
| 4,084,947 A | 4/1978 | Ear |
| 4,323,373 A | 4/1982 | Fritz |
| 5,472,342 A | 12/1995 | Welsh, II et al. |
| 7,614,396 B2 | 11/2009 | So |
| 2007/0240742 A1 | 10/2007 | Kwok et al. |
| 2009/0042500 A1 | 2/2009 | Robison et al. |
| 2011/0229376 A1* | 9/2011 | Ray ................ B03C 3/025 422/120 |
| 2012/0138478 A1 | 6/2012 | Yost, III et al. |
| 2012/0247074 A1 | 10/2012 | Chmayssani et al. |
| 2012/0317940 A1 | 12/2012 | Ball et al. |
| 2013/0133518 A1* | 5/2013 | Allan ................ B03C 3/68 96/52 |

\* cited by examiner

ELECTRIC PRECIPITATOR AIR POLLUTION CONTROL DEVICE

CLAIM OF PRIORITY

This non-provisional application claims priority to U.S. Application No. 62/453,170 filed on Feb. 1, 2017. Further, this non-provisional application is a continuation-in-part of U.S. application Ser. No. 15/138,784 filed on Apr. 26, 2016 which claims priority to U.S. Ser. No. 14/287,632 (now U.S. Pat. No. 9,327,224 issued May 3, 2016) filed on May 27, 2014 which further claims priority to U.S. Application No. 61/827,191, filed May 24, 2013, the contents of all of which are hereby fully incorporated by reference herein.

FIELD OF THE EMBODIMENTS

The field of the embodiments of the present invention relate to electrostatic air precipitators for emission remediation, specifically in a restaurant or kitchen environment.

BACKGROUND OF THE EMBODIMENTS

The emission profile from commercial cooking operations has been well studied and shown to consist of particles (aerosols), semi-volatile organic compounds (sVOCs), volatile organic compounds (VOCs) and inorganic volatile species. The particles give rise to visual smoke and the sVOCs and VOCs give rise to odors, all undesirable components of any industrial size kitchen.

The mass, size distribution, and organic chemistry profile of the emissions can vary widely and are primarily functions of the type of cooking apparatus and the chemical and structural composition of the raw food being cooked. The most severe challenge to cooking emission remediation has been demonstrated repeatedly to be the emissions generated by gas char broiling of ground beef patties, with the severity of emissions being proportionately related to the fat content and the degree of well doneness of the beef patties. Of particular note is that the aerosol and chemical profiles of char broiled ground beef have been characterized and shown to not be dissimilar from the emission profile of diesel exhaust. Of particular concern are the National Ambient Air Quality Standards (NAAQS) and EPA Title V air toxics that are released. These include but are not limited to: PM2.5, PAH (poly aromatic hydrocarbons), butadienes, other toxic VOCs and ozone precursors. Indeed, air quality management districts in California are currently in the process of generating cooking emission remediation standards for charbroiling of beef, and the Bay Area Air Quality Management District (BAAQMD) has already promulgated such regulations.

Historically, there are two established ways of remediating the particulate (aerosol) cooking emissions: removal from the airstream by electrostatic deposition onto alternatively charged plates or mechanical removal of the aerosols by passing the airstream through a series of progressively more efficient media filters. Established known mechanical filtration properties include impaction, interception, and interference.

Both technologies have been proven to be highly effective and there are advantages to choosing one over the other. One main advantage of electrostatic precipitators is that the pressure drop through the filters is 50-75% less than through clean mechanical filters, with that difference becoming more pronounced as the mechanical filters load. For an electrostatic precipitator the pressure drop remains constant, whereas, as mechanical filters load, the resistance to airflow increases, thus decreasing the total air that can be exhausted in the kitchen hood. This is a concern for modern day low flow hoods. This condition often mandates a constant flow control system and/or filter change warning mechanisms. Another advantage is that the electrostatic precipitators can be programmed for nightly washing, thus removing the grease from the duct pathway and decreasing the risk of fire presented by accumulated grease in the ducted system.

Electrostatic precipitators (ESP) comprise one type of filtration technology that is used for particulate removal in various industries and under various conditions. Though ESP designs and their applications vary widely, they all involve the fundamental principle of imparting an electric charge to a particle and then exploiting that now charged particle's attraction and/or repulsion to an electrostatic field to collect that particle and remove it from the air. Historically, there have been single stage (Claudius) ESPs and two stage (Penny) ESPs, with the latter performing better when the airflow through the collecting plates being of a laminar nature. ESPs have been utilized for the control of greasy emissions from cooking operations. To invent an enhanced performing (i.e. greater collection efficiency at higher airflows) for this specific application requires a thorough understanding of: 1) the chemical and physical characteristics of the particulate to be removed 2) the physical principles of high voltage ionizer and collector array designs and 3) fluid dynamics and flow through the machines. Further, design attention to how effectively the collected particulate is washed from the collection surfaces and other machine serviceability issues such as removable filtering component weights and durability may also be considered an improvement.

The greasy particulates generated in cooking in general and meat char broiling in particular vary in aerodynamic diameter from 0.1 µm to 10 µm. In the case of meat char broiling particle size nodes exist at the 0.2 µm and 5 µm particle diameters. Their chemical composition consists of $C_4$-$C_{28}$ carbon chain molecules with various moieties attached. The particles formed during the combustion process may consist of a solid material or an oily liquid or liquid coating on elemental carbon particles or a mixture of solid material and liquid. The main chemical property of the particulate of concern to the ESP design is its resistivity which governs both how much charge it can acquire as well as how it potentially negatively affects the voltage density at the collector plate surface in the form of spark overs and back coronas.

Once the physical and chemical nature of the particles to be collected are determined, a consideration of the governing dynamic equations of particle charging and drift velocity of a charged particle in an electric field are taken under consideration to design a machine. Attention must be paid to the type, configuration, voltage and polarity of the both the ionizing source and collector surfaces. The hardest particles to capture are those that are the smallest because 1) they typically do not pick up as much charge do to their small size and 2) their momentum in the airstream is more difficult to overcome with the established electrostatic force of the collector surface system.

The electrostatic force acting on charged particles is governed by Coulomb's law which describes the force interacting between static electrically charged particles. The force of interaction between the charges is attractive if the charges have opposite signs (i.e., F is negative) and repulsive if like-signed (i.e., F is positive).

Turbulence of the airstream is also a significant consideration as it can affect the probability of a particle getting deposited by electrostatic forces only. Ideally, collector plate systems operate under laminar flow conditions. The determination of whether or not laminar flow conditions exist may be assessed by determining the Reynolds number. Experimental studies finding laminar flow to be at around a Reynolds number of below 2500.

It has been observed in field units that were equipped with real time voltmeter and ammeters in series with high voltage power supplies operating under real world conditions that in the ESP process of charging and/or removing charged particles from the airstream by electrodeposition, there is intermittent arcing between the energized surfaces in the unit. Both the voltage and amperage readouts of the power supplies were observed to decrease for periods between 10 and 100 milliseconds. This was also confirmed by observing flickering of high voltage power supply lights in other ESP units without said monitoring equipment. It is reasonable to conclude that during these brief losses of power, the strength of the ionizing and collecting electrostatic fields are briefly diminished and during that diminish time period less or possible no charging of particles or collection of particles occurs.

At airflow rates of 400-600 feet per minute, a 100 millisecond time represents a travel distance of 1 foot, which is longer than the collector plate length in most two stage Penny type precipitators. Further, all of the particles passing the ionizer during that 100 millisecond period would acquire no or less electric charge had the ionizing field not been diminished. Thus the probability of collecting this cohort of particles is diminished. Two factors imply a solution: the ground short is most often affected by collector plate arcing and the charged particles are collected on ground surfaces. Thus at any point in time, the chance of particles not being charged is infinitesimal and most of the time the particles are picking up more charge because of the even offset of the first and second ionizer. This increased charge to mass ratio greatly helps in the collection efficiency in electrostatic precipitators.

Careful design attention must be paid to ionizer design with regards to configuration and spacing, ionizing and insulating materials, voltage density and ruggedness. Likewise collector plate cells are designed for configuration and spacing, weight and handling, wash ability, insulator material and design and cell to cell connectors. After classical formulas were utilized to predict electric field strengths, deposition velocities, and laminar flow paradigms; the theoretical designs were engineered to the theoretical specifications and tested both on the bench and then in the actual ESP unit under airflow and both surrogate and real cooking test challenges.

The interplay between ionizing voltage, ionizer type, collector plate length and spacing and air velocity through the ESP to determine a particle's size specific removal efficiency. This in turn determines how fast the smallest particles can move through the collector plates and still be driven to the collector plate by the specified voltage gradient. If plates are spaced too closely, arcing can occur which discharges the entire electrostatic capacitance and eliminates the voltage density. Any air passing through the plates during such a discharge period is not subject to collection by electrostatic deposition.

A broad survey of the existing and obsolete ESP designs that have been utilized in the food service industry reveal a fairly common ESP design. Firstly, they are fairly large in all three dimensions of length, width and height which is due to typically low air velocities that are required to achieve greater than or equal 95% efficiency removal of 0.3 μm. They are normally operated dry (except during wash cycles), and consist of a single planar array of ionizer elements immediately followed by single planar array of alternating collector plates and grounded plates. The collector plate lengths typically cover two ranges: specifically less than or equal to 6 inches or greater than or equal to 10 inches. Likewise, the plate spacing (between alternatively charged and grounded plates) is either precisely 0.25 inches or 0.29 inches. No ESP collector cells are known to have dimensions that fall outside of these specific dimensions, even though Reynolds number evaluation theoretical electro deposition calculations for laminar airflow regimes indicate that they should be.

A need in the industry exists for an ESP that is able to fit into tight spaces within restaurant kitchens, by limiting the sizing of the components and the spacing there between, but be capable of removing a maximum amount of particulate at a reliable and rate at the same time, by ensuring that a maximum amount of particles have a charge applied to them, by improving on flow characteristics through the ESP.

SUMMARY OF THE EMBODIMENTS

The present invention and its embodiments are generally related to an ESP capable of producing a laminar flow through one or multiple ionizing sections, while being reliably powered as required.

Embodiments of the present invention include an electrostatic air precipitator for emission remediation which includes a grounded frame, a housing having an upstream direction and a downstream direction, a first ionizing section, comprising at least a first set of ionizing members and a second set of ionizing members, wherein the ionizing members of the first set and the second set being electrically isolated from each other and electrically isolated from the grounded frame, wherein the ionizing members and the of the first set and the ionizing members of the second set being powered by separate power supplies, and at least a first collector section located downstream of the first ionizing section, the first collector section comprising at least a first plurality of collector plates. The second set of ionizing members and the collector section can be powered by the same power supply.

The first set ionizing members and the second set of ionizing members can be alternatingly arranged across the ionizing section.

It is another object of the embodiment of the present invention to have a cleaning system located proximate to the at least first collector section. The cleaning system can be fixed or can be oscillating. The system can include sprayers to wash off the collected crud off the collector plates.

It is yet another object of the embodiment of the present invention to have the first set of ionizing members and the second set of ionizing members be vertically aligned panels wherein each panel comprises at least one arc, but preferably multiple arcs, facing upstream and at least one arc, but preferably multiple arcs, facing downstream, and can also include a spike or spikes facing perpendicular to the upstream-downstream direction.

It is another object of an embodiment of the present invention to have collector plates that are ideally between about 6.5 and about 9.5 inches in length and spaced apart by about 0.21 and about 0.24 inches or between about 0.26 and about 0.28 inches, helping ensure laminar flow, and decreasing the chances of arching between the plates.

It is yet another object of the embodiment of the present invention to have a perforated metal shield located upstream of the first ionizing section, wherein perforations comprise about 40 to about 60 percent of the metal shield, helping decrease the ingestion of large particles and debris into the system.

It is yet another object of the embodiment of the present invention to have at least one droplet source configured for injecting droplets, the droplets having a diameter between about 1 μm and about 200 μm. The droplet source can be located at the ESP airflow inlet, downstream of the shield, or immediately upstream of the collector section. The droplet source can be connected to a charging source configured to ensure the droplets carry a charge, or simply inject non-ionized droplets into the air stream.

It is yet another object of the embodiment of the present invention to have at least one heat exchanger located upstream of the ionizing section, helping decrease the temperature of the airflow through the ESP.

It is yet another object of the embodiment of the present invention to have a Photocatalytic Oxidation section having a UV light, a UVC light preferably at the downstream end of the ESP allowing for getting rid of odors.

It is yet another object of the embodiment of the present invention to have a second ionizer section located downstream of the first collector section, and at least a second collector section located downstream of the second ionizer section and an cleaning system between the first collector section and the second ionizing section, which can include oscillating or rotating spray heads. The collector plates of the first plurality of collector plates can be spaced apart by between about 0.26 inches and about 0.29 inches, and the second collector section comprises a second plurality of collector plates, the plates of the second plurality having a spacing of between about 0.20 and about 0.24 inches. The ESP can further a third collector section downstream of the second collector section. With the collector plates of the third collector section being offset across the upstream direction with the second plurality of collector plates. The offset are meant to place the plates of neighboring collector sections in the center of the gaps between each of the plates of each collector section, helping ensure that whatever particle pass without being collected by the second section are picked up by the third.

In addition to the foregoing, other objects, features, aspects and advantages of the embodiments of the present invention will be better comprehended through a careful reading of a detailed description provided herein below with appropriate reference to the accompanying drawings.

BRIEF DESCRIPTION OF THE DRAWINGS

Example embodiments will become more fully understood from the detailed description given herein below and the accompanying drawing, wherein like elements are represented by like reference numerals, which are given by way of illustration only and thus are not limitative of the example embodiments herein.

DETAILED DESCRIPTION OF THE EMBODIMENTS

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Figure 1:
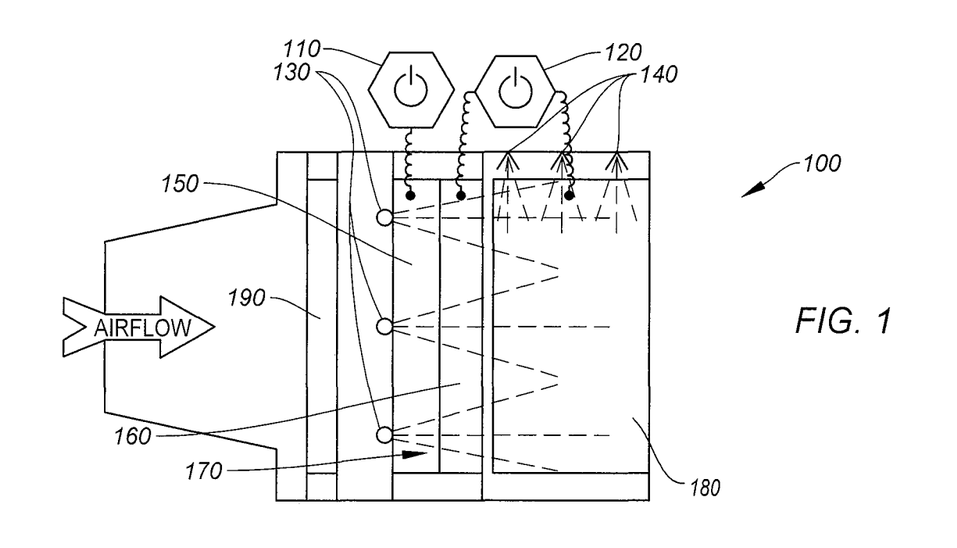
FIG. 1 shows a detail of an ionizing and collector sections of an embodiment of the invention.

FIG. 1 shows an ESP 100 system for passing a contaminated airflow through a housing and passing it by an ionizing section 170 that includes two separate sets of ionizing members 150 and 160 and subsequently flowing to a collector section 180. Each of the separate ionizing members 150 and 160 can be powered using separate power supplies 110 and 120. A separate power supply energizes each of the standalone ionizer sections 150 and 160, therefore decreasing the probability of not ionizing certain particles as they flow through the ionizing section 170 due to shorting downstream or anywhere in the system. Downstream from the ionizer sections 150 and 160 are grounded surfaces on which the ionized particles are collected. Loss of charging of the emissions is the most egregious component of this system failure. Thus, the ionizer sections 150 and 160 are duplicated and each section has its own power supply with only the second power 120 supply being associated with collector section 180, allowing the first ionizer 150 to keep ionizing particles as they pass, if the second ionizer 160 shorts momentarily due to arching in the collector section 180 downstream.

Further seen in FIG. 1 the electrostatic precipitator (ESP) 100 can include an optional inlet transition to smooth airflow entry into the ESP, the inlet transition serves to smooth the entry of air into the unit 100, reducing the turbulence and eliminating water leakage at the opening of the ESP, if water is incorporated in the unit. A prefilter 190 for blocking large particles and debris from being ingested by the more delicate portions of the ESP 100. The prefilter 190 may consist of a multi-layer metal mesh filter, perforated metal sheet or kitchen hood type grease filter to remove any large clumps of grease and evenly distribute the airflow. The prefilter 190 may be washable in place. Alternatively or in addition a metal perforated plate can be placed upstream of the collector section 180 in order to help further facilitate laminar flow. The perforated plate can include perforations making up between 40 and 60 percent of the plate. The metal portions of the perforated plate can be shaped in order to straighten the flow such that it is in line with the upcoming collector component. A collector section 180 can include plate assembly and a wash system of fixed spray nozzles 140.

The two ionizer sections 150 and 160 of the ionizing section 170 may be in separate metal frames or fabricated as one framed assembly. In both configurations, the ionizing elements in the first section 150 are independently energized from the second section 160 ionizing elements. The two sets of ionizing elements may be directly aligned in the upstream-downstream direction or offset in the direction of airflow. The ionizing elements should be parallel to each other.

Figure 2:
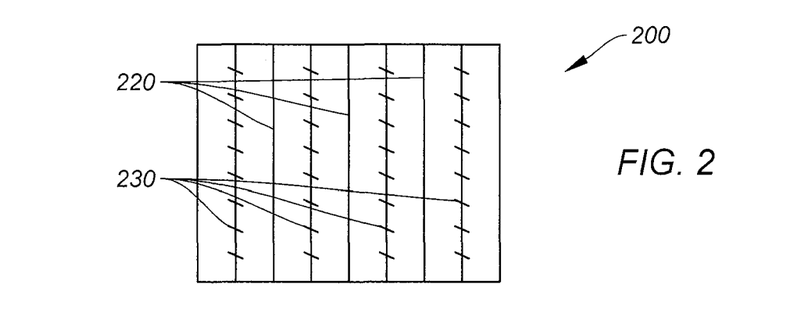
FIG. 2 shows a frontal view of an ionizing section of an embodiment of the invention.
Figure 4A:
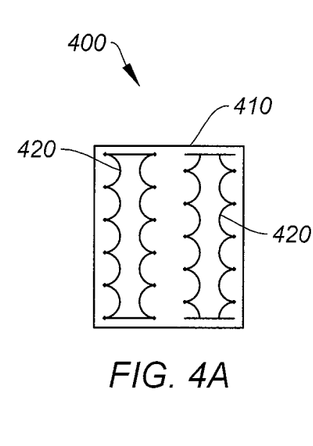
FIG. 4a shows a cutaway side view of an embodiment of collector plates of an embodiment of a collector section of the invention.
Figure 4B:
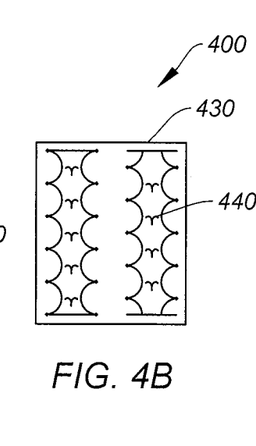
FIG. 4b shows a cutaway side view of a second embodiment of collector plates of an embodiment of a collector section of the invention.

A frontal view of the ionizer section 200 with parallel planar ionizing elements is shown in FIG. 2. The ionizing elements 220 and 230 may be tungsten wires, preferably of about 0.007 inches to about 0.010 inches in diameter or the ionizing elements can be plates. The plates can include arches or crescent shaped spikes, as shown in FIGS. 4a and 4b. The crescent shaped spikes, or arches allow contact between the particles and the ionizing field to occur at different points along the flow path, with the downstream arcs 420 helping ionize the particles that had not been ionized by the upstream facing portion of the ionizing elements. In FIG. 4b evenly spaced perpendicular spikes 440 located on the main spikes perpendicular to the direction of airflow further increase the ionizing surface area. Any of these ionizer types may be used in planar assemblies of ionizers. Multiple plates 420 can be placed in series along the flowpath within each of the ionizer sections 150 and 160. When both passes of ionizers consist of crescent spike assemblies, the peaks of the first pass crescents align with the valleys of the second pass crescents as seen in FIGS. 4a and 4b. The ionizer elements are so arranged as to minimize or prevent any back sparking or arcing at the specified high DC voltage. The ionizer elements are electrically isolated and insulated from the grounded metal ionizer frames 430 and 410. The power supplies 110 and 120 (PS) provides an output DC voltage output that is selected to provide a voltage gradient between 10 and 12.66 kVdc depending upon the ionizer type and configuration with an optimization output voltage density of 12.66 kVdc/inch. The PS 110 and 120 is selected to maintain a set voltage at a constant amount for up to three ionizer assemblies across the width of the ESP.

The first power supply 110 is not associated with any collector plates of the collector section 180, it is not subject to momentary capacitance discharges associated with the particle deposition process and/or arc sparking. It is during these momentary capacitance losses that passing particles can both not be charged and/or not be collected thus the novel design accounts for and minimizes this effect. The second stage ionizer is powered by a HVPS whose output voltage is simultaneously reduced (typically to half the output voltage of the ionizer) to impart electrostatic charge and voltage density to the alternating (with grounded plates) energized plates. With proper ionizer spacing design this independent first pass ionizer configuration can assure that the air stream will always see at least one fully energized ionizing corona at all times. Typically the first pass ionizer can be of a higher ionizing voltage than the second stage ionizer due to the fact that most arcing occurs in the collector plates operating at typically half the voltage. This is shown in FIG. 1. The output voltage for the first HVPS for the ionizer component can range from 10-16 kVDC. The output voltage for the second HVPS can range from 10-14 kVDC and halved or 5-7 KVdC for the collector plates. This HVPS can energize up to three ionizer and collector assemblies arranged in series ion one pass across the width of the ESP.

Figure 3:
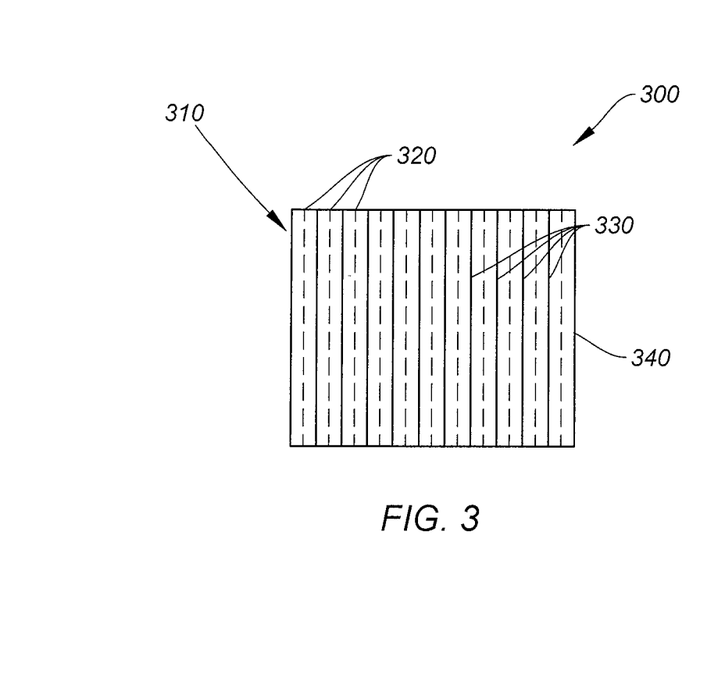
FIG. 3 shows a frontal view of a collector section of an embodiment of the invention.

The polluted air stream next reaches the collector section 180 consisting of an array of alternating grounded 320 and energized collector plates 330 held together in a rigid metal frame 340 that electrically isolates the charged from the grounded plates as shown in FIG. 3. A removable perforated metal sheet consisting of 40-60 percent open area can be installed upstream of the collector plate assembly to facilitate the transition of the airstream to laminar flow through the collector plates. The spacing of the collector plates 330 and 340 may range from 0.26-0.29 inches or 0.20-0.24 inches depending on the degree of upstream filtration and if required to achieve laminar flow through the plate section. The collector plate length may vary from 6.5 to 9.5 inches. The specific dimensions help ensure laminar flow throughout the collector section 180s. The voltage gradient for the collector plates range from 20 to 25 kVdc/inch with an optimization goal of 25 kVdc/inch. The alternating ground 320 and energized plates 330 may or may not be attached to the second planar ionizer section. The advantage to a completely separate collector sections is to make the collector plate assemblies lighter in weight and easier to service, as they can be removed one at a time without having to touch the ionizing sections. This is particularly true when a double or triple collection plate system is incorporated and these additional plate systems require closer plate spacing (and thus more plates) for laminar flow conditions at higher air volumes.

Figure 5:
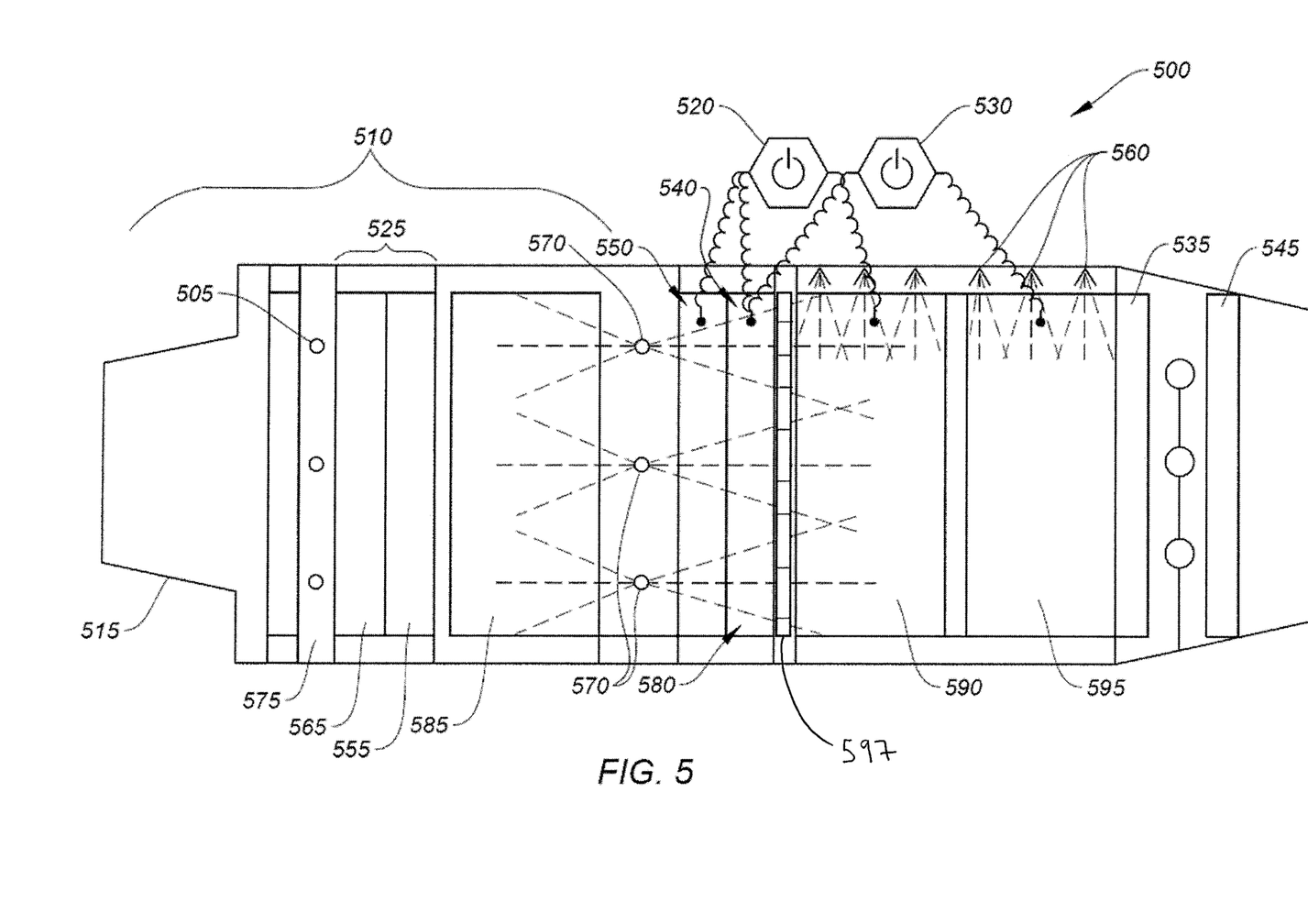
FIG. 5 shows a side view of an embodiment of a triple pass ESP.

In a second embodiment of the invention shown in FIG. 5, an ESP 500 is shown with multiple ionizing section 525 and 540, multiple collector sections 585, 590, and 595. Some of the features of present embodiment have been shown in the previous embodiment, such as isolated power systems 110 and 120 and the wash systems 560. This principal is repeated with a triple pass unit where each of the ionizer sections of the second dual ionizer is associated with collector plates. It is therefore highly likely that three of the four ionizers have full strength electric charging fields and two passes of collector plates are fully energized. This principal greatly enhances collection efficiencies of the smallest of particles which are the hardest to collect. With this design principle the length of the collector plates can be reduced thus keeping the overall unit length to that of a conventional two pass system. Further the savings in material and labor to make the smaller cells can offset the cost of the extra power supplies. With respect to laminar flow, the need for laminar flow decreases through the first ionizer and collector sections as a second system is available downstream. By allowing faster and more turbulent flow through the first section, the plates and components of the first section can be placed further apart, decreasing the difficulty of and need for cleaning as often.

The same configuration of dual ionizer and collector/ground plates are employed as in the first embodiment and comprise the first pass of a double or triple pass unit (pass referring to the number of collection plate assemblies that that air stream traverses before exiting the machine); however, one or two more ionizer assemblies 550 and 540 and one or two additional ground/energized collector plate sections 590 and 595. The two ionizers can be independent or fabricated in one assembly with the same variations in ionizer type and construction as in the first embodiment. Again, the alternating energized and grounded plates may be assembled in a standalone groundable metal frame assembly so as to conserve. Alternatively, one or two uni-cells (each with its integral ionizer and collector plate assembly) could be used for a double or triple pass configuration respectively. Between one and three additional power supplies 520 and 530 can be used in these various configurations to achieve ionizacion and collection voltage densities as described in the first embodiment embodiment The target airflow velocities to achieve≥95% removal of 0.3 μm grease particles with the double pass or triple pass ESP units range for flow speeds of between 600-1000 fpm. To achieve these efficiencies careful attention is again paid to plate spacing and whether the airflow between the plates is laminar (Re<2500) or turbulent (Re>2500). As the airflow through the collector assembly(s) increases, the plate width needs to decrease to achieve laminar flow. For all embodiments, laminar flow is preferred; however, for heavy concentrations of particulate at higher airflows, a first or first and second pass turbulent airflow stage(s) (aka plate spacing in the higher range of 0.26-0.28) may be required. This would serve to remove a large percentage of the overall mass of the grease emissions without short circuiting plates and to accommodate more efficacious washing of the grease from off of and between the plates. It is in these hybrid flow designs that the aforementioned perforated plates may again be utilized to help transition from turbulent to laminar flow by being inserted between the two flow sections (510 and everything else downstream).

Figure 9:
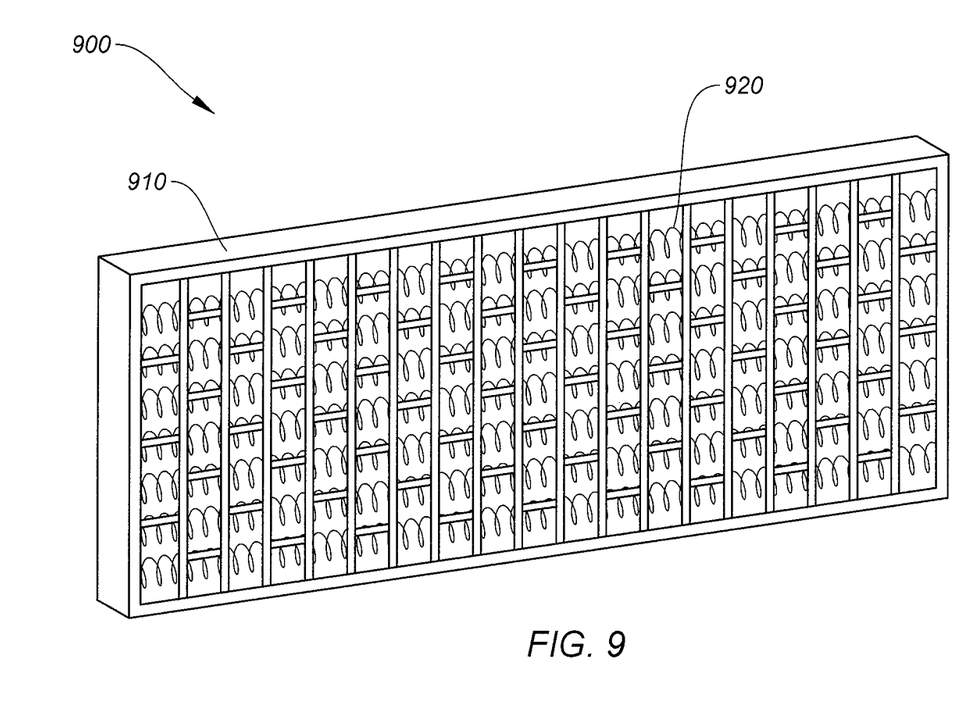
FIG. 9 shows an embodiment of shield used in the ESP.

An alternative collector device, to the plate arrangement described above, can be employed in the first and second embodiments. The alternative collector 900 shown in FIG. 9, can include metal coils 920 compactly aligned in a frame 910 to which either an opposite potential charge (to the charged particles) is applied or conversely a ground state is maintained with charged particles removed from the airstream in both cases.

A further alternate collector assembly can incorporate collector plate assemblies wherein the surfaces of some or all of the plates would be wetted with water and/or a water/surfactant mixture so as to render the precipitator a "wet" electrostatic precipitator and in the process collect a fraction of the more polar gas phase VOCs in the waste air stream Both of the previously mentioned embodiments may contain a wash system 505 which may be comprised of an oscillating manifold in front of a dual ionizer section 525 and behind the initial mesh or grease removal filter. The wash system 560 may also be located in the top section of the housing. For laminar flow, it may be desirable to include fixed nozzles in the top of the ESP housing with the nozzle assembly minimally protruding through metal housing to reduced free airspace above the collector cells, in order to further keep the flow laminar by not introducing obstructions into the flow stream. Both oscillating and fixed nozzle wash configurations are shown in FIG. 5.

Figure 6:
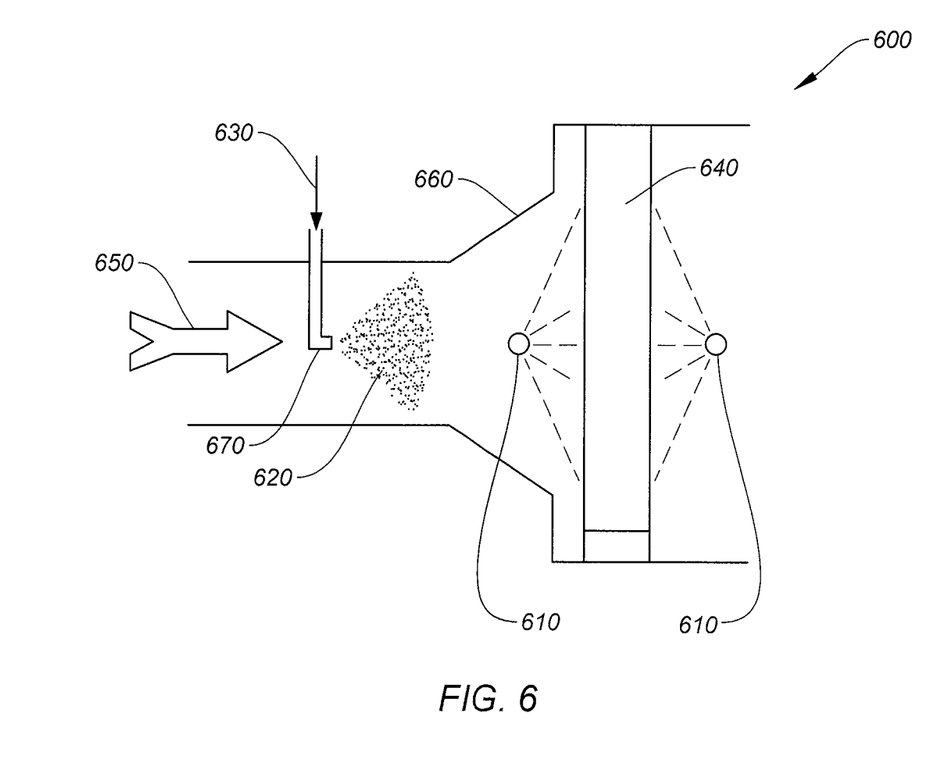
FIG. 6 shows a detail of a side view of an embodiment of a droplet producer at an inlet section of an ESP.
Figure 8:
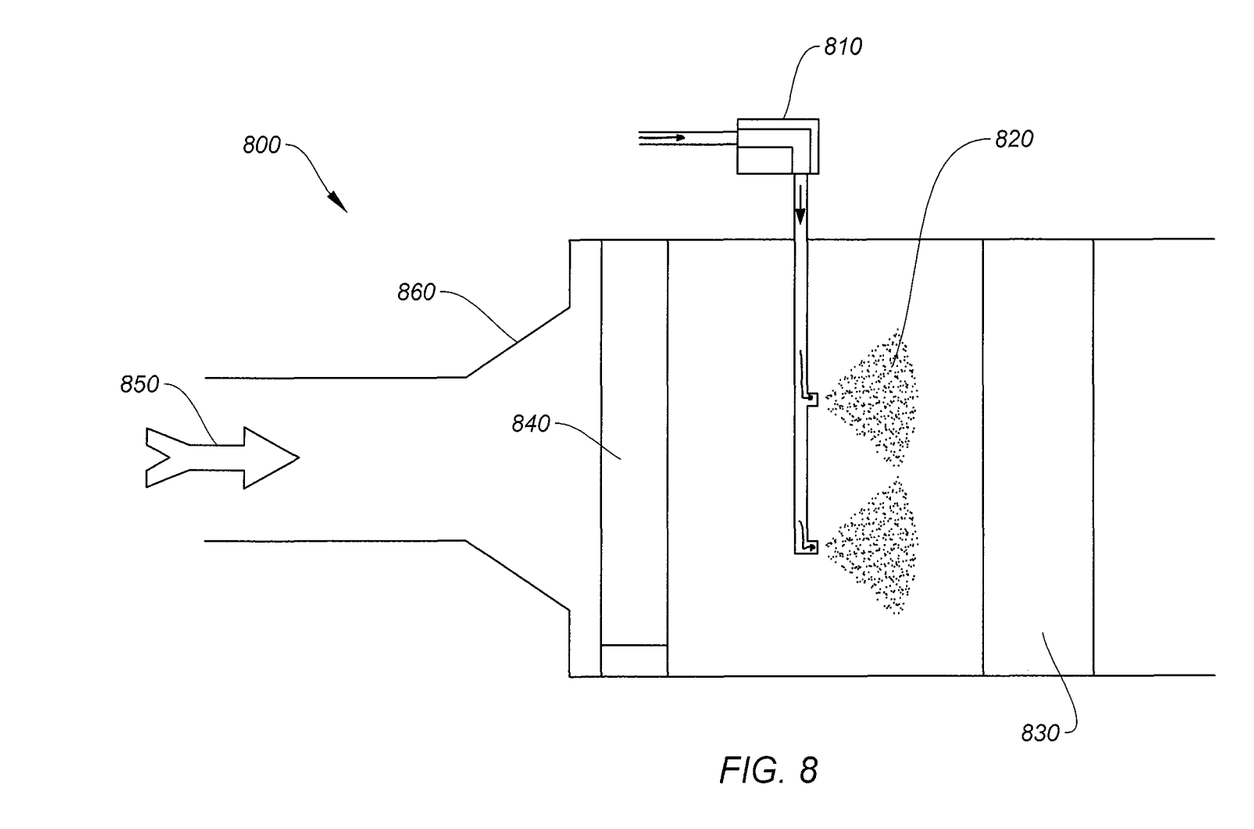
FIG. 8 shows a side view of an embodiment of a droplet producer downstream of the ESP inlet.

FIGS. 6 and 8 show fogging (<20 μm diameter) and misting (<200 μm diameters) devices. A droplet producer 670 upstream of the ionizing stages can improve overall emission reduction in several important ways. The first is to cool the air stream by evaporative cooling which facilitates condensation of some of the gas phase pollutants with lower boiling points to the liquid (aerosol phase) and thus makes them collectible downstream in the unit. The fog droplets can be generated by electrically energized mechanical production such as high pressure pumps or ultrasound generators. Water filtration to reduce dissolved solids to assure clog free nozzle operation may be utilized. Dissolved ozone may be introduced into the droplets and the pH of the feed water may be boosted to facilitate Advanced Oxidation Processes.

The mist droplets could be generated using spray nozzles that generate the requisite droplet sizes at typical building water pressures. FIG. 6 shows the water 630 entering the nozzle of the droplet producer 670 and being delivered into the airflow 650 as a mist or fog 620.

Further, when excess water is present and the air stream passes through a packed or baffled grease type filter upstream of the ionizing elements; some of the more polar volatile compounds can be solubilized while at the same time, a significant portion of the condensed particles can be removed. This filter also serves a mist eliminator allowing only water vapor to proceed on to the ionizing elements. Another direct benefit of fogging/misting systems upstream of the ionizer is that the increased relative humidity of the air stream facilitates a reduction of potential sparking and back corona due to any high resistivity values of the deposited particulate.

Figure 7:
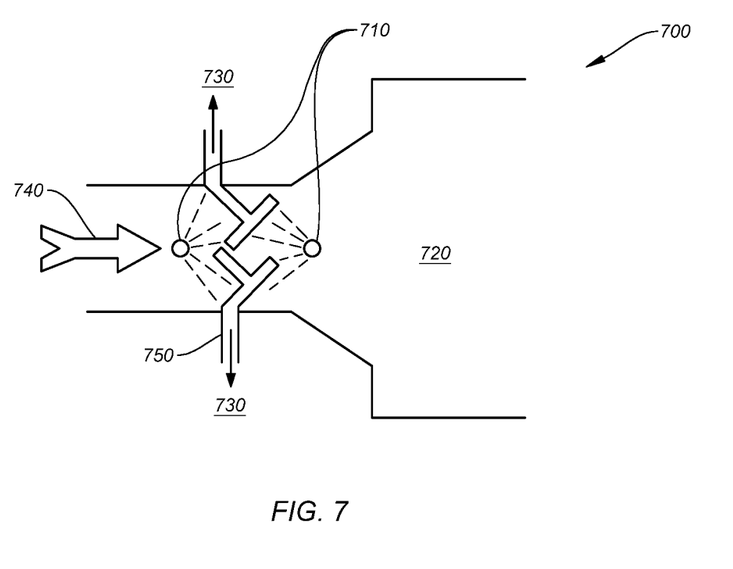
FIG. 7 shows a detail of a side view of an embodiment of a heat exchanger at an inlet section of an ESP.

Another method to reduce the exhaust air stream temperature is to install a heat exchanger 750 at the inlet of the ESP 700 wherein a heat transfer liquid 730 is circulated through the heat exchanger 750 to remove the heat and transfer that heat to incoming makeup air 740 or some other heat sink. This is shown in FIG. 7. The heat exchanger 750 can be plate type heat exchanger. Both of the heat exchanger and the upstream spray droplet, and the grease filter methodologies require in place wash systems 610, 710 to remove impacted particulate on the heat exchange plate surface and/or to wash down the packed or baffled filter 190. Apart from selecting a typical detergent that would be protective of the stainless steel components, a bio engineered degreasing cleaner may be employed that could be intermittently sprayed onto the dirty metal filter surfaces. This, in turn, could keep the plates clean as long as they were maintained in a moist condition which would be the case when fog or mist is utilized. Alternatively a 180 degree oscillating wash manifold or fixed wash manifolds may be used to clean the front and back surfaces of the grease filter, the heat exchanger front and back, and the ionizer assembly and the front part of the collector plates. The heat exchanger, droplet producers, and the metal filter can all be used in conjunction or can be employed separately. Each of the items can be introduced into existing systems or can be built into a new apparatus.

FIG. 8 shows a second injection location for the fog or mist droplets 820 being downstream of the ionizers 840 which thus impart a charge similar to the ionizer which is of the same polarity of the charged grease particles. After interacting with the charged pollutants all the charged aerosols be collected on the surfaces of collector assembly 830 that has an opposite polarity to the ionizer and mist. Alternatively the water droplets could be imbued with an opposite charge to the ionizer thus serving as the electrostatic collection device itself and which would, in turn, be collected on the collector 830 which could be maintained at ground or an appropriate opposite voltage. The combination of the ionizer section 840, the spray droplets 820 and the spray charging mechanism 810 can be selected to have the appropriate polarity effect on the airflow such that a maximum amount of pollutant is deposited on in the collector section 830.

Figures 10, 11:
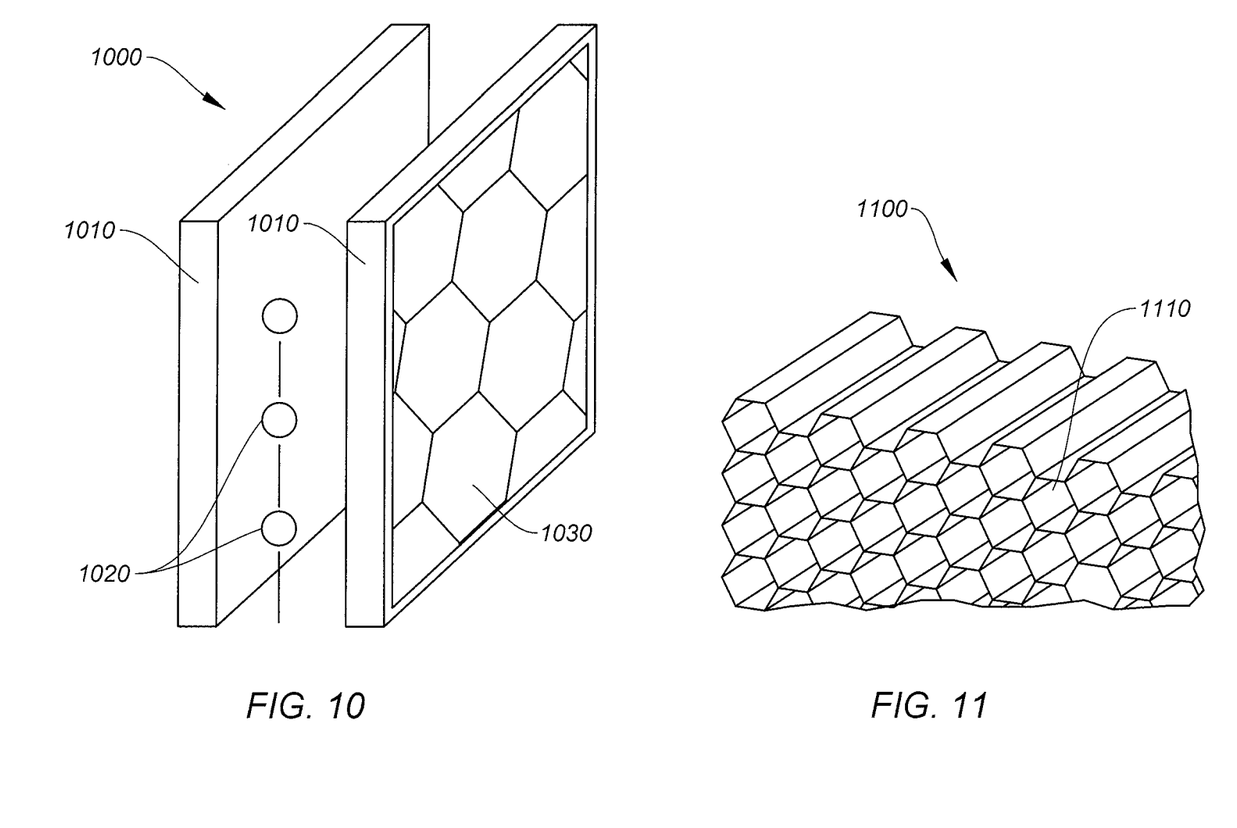
FIG. 10 shows an embodiment of a Photocatalytic Oxidation section of the ESP.
FIG. 11 shows a detailed view of the Photocatalytic Oxidation section of the ESP.

FIGS. 10 and 11 show details of a Photocatalytic Oxidation assembly which can be included downstream of the electrostatic collection device may be included, as shown by in FIGS. 5 (535 and 545). The device consists of pre 535 and post 545 metal filters containing a photo catalyst and UVC lamps 1020 capable of emitting greater than 254 nm wavelength output which both activates the catalyst, directly oxidizes some of the molecular species and converts ozone generated upstream by the ionizing coronas to Advanced Oxidation Process species that decompose in milliseconds further oxidizing VOCs. A type of sorbent may be included after the electrostatic collection assembly called hydrophobic synthetic zeolites that works on the principle of molecular sieving and can be synthesized to target the smaller chain ($<C_{10}$) carbon molecules present in the emission airstream and which have small probability of being adsorbed and retained by activated charcoal. This formulation of hydrophobic synthetic zeolite covers all formulations with a $SiO_3:Al_2O_3$ ratio range of 5-200 and an internal pore size of 0.3 to 1.0 nanometers. The UVC light, of below 400 nm wavelengths, also activates a $TiO_2$ coating to convert ozone generated by the ionizing elements in earlier stages or before the unit inlet to a surplus of hydroxyl radicals which in turn initiate advanced oxidation processes (AOP) to enhance the oxidation of submicron particulate and gas phase pollutants.

An inclusion of a bipolar point ionization technology downstream of the collector section whose purpose is destroy VOCs that are not collected on the upstage collector section without the generation of oxidizers. The example embodiments being thus described, it will be obvious that the same may be varied in many ways. Such variations are not to be regarded as departure from the example embodiments, and all such modifications as would be obvious to one skilled in the art are intended to be included in the following claims.

The invention claimed is:

1. An electrostatic air precipitator for emission remediation comprising:
    a grounded frame;
    a housing having an upstream direction and a downstream direction;
    a first ionizing section, comprising at least a first set of ionizing members and a second set of ionizing members, wherein the ionizing members of the first set and the second set being electrically isolated from each other and electrically isolated from the grounded frame, wherein the ionizing members of the first set and the ionizing members of the second set being powered by separate first and second power supplies; and
    at least a first collector section located downstream of the first ionizing section, the first collector section comprising at least a first plurality of collector plates or plurality of metal coils, wherein the second set of ionizing members and the first collector section are powered by the second power supply, and wherein the first set of ionizing members are powered by the first power supply held between about 2 and about 4 kVDC higher than the second power supply.

2. The electrostatic precipitator of claim 1, wherein the first set of ionizing members and the second set of ionizing members being alternatingly arranged across the first ionizing section with each member of the second set of ionizing members being located at a midpoint of spaces between each of the first set of ionizing members, and the first set of ionizing members located upstream of the second set of ionizing members.

3. The electrostatic precipitator of claim 1, further comprising a cleaning system located proximate to the at least first collector section.

4. The electrostatic precipitator of claim 1, wherein the first set of ionizing members and the second set of ionizing members comprise vertically aligned panels wherein each of the vertically aligned panels comprises at least one arc facing upstream and at least one arc facing downstream.

5. The electrostatic precipitator of claim 4, wherein the vertically aligned panels further comprise at least one spike perpendicular to the upstream direction and the downstream direction.

6. The electrostatic precipitator of claim 1, wherein the at least first plurality of collector plates are between about 6.5 and about 9.5 inches in length.

7. The electrostatic precipitator of claim 2, wherein a distance between each of the at least first plurality of collector plates is between about 0.21 and about 0.24 inches or between about 0.26 and about 0.28 inches.

8. The electrostatic precipitator of claim 1, further comprising a perforated metal shield located upstream of the first collector section, wherein perforations comprise about 40 to about 60 percent of the perforated metal shield.

9. The electrostatic precipitator of claim 1, further comprising at least one droplet source configured for injecting droplets.

10. The electrostatic precipitator of claim 9, wherein the droplets have a diameter between about 1 µm and about 200 µm.

11. The electrostatic precipitator of claim 9, wherein the at least one droplet source is located upstream of the first set of ionizing members and the second set of ionizing members.

12. The electrostatic precipitator of claim 9, wherein the droplets are charged by an electrostatic charging device.

13. The electrostatic precipitator of claim 9, wherein the at least one droplet source is located downstream of the first set of ionizing members and the second set of ionizing members.

14. The electrostatic precipitator of claim 1, further comprising at least one heat exchanger upstream of the first ionizing section.

15. An electrostatic air precipitator for emission remediation comprising:
    a grounded frame;
    a housing having an upstream direction and a downstream direction;
    a first ionizing section and a second ionizing section, the first ionizing section comprising at least a first set of ionizing members and a second set of ionizing members, wherein the ionizing members of the first set and the second set being electrically isolated from each other and electrically isolated from the grounded frame, wherein the ionizing members of the first set and the ionizing members of the second set being powered by separate first and second power supplies;
    a first collector section located downstream of the first ionizing section, the first collector section comprising at least a first plurality of collector plates wherein the second set of ionizing members and the first collector section are powered by the second power supply, and wherein the first set of ionizing members are powered by the first power supply held between about 2 and about 4 kVDC higher than the second power supply;
    a second ionizing section located downstream of the first collector section, and at least a second collector section located downstream of the second ionizing section; and
    a flow straightener located between the second ionizing section and the second collector section.

16. The electrostatic precipitator of claim 15, further comprising an oscillating or fixed cleaning system between the first collector section and the second ionizing section.

17. The electrostatic precipitator of claim 15, wherein the plurality of collector plates are spaced apart by between about 0.26 inches and about 0.29 inches, and the second collector section comprises a second plurality of collector plates, the second plurality of collector plates having a spacing of between about 0.20 and about 0.24 inches, the first plurality of collector plates and the second plurality of collector plates being aligned in an upstream-downstream configuration.

18. The electrostatic precipitator of claim 17, further comprising a third collector section downstream of the second collector section, wherein collector plates of the third collector section are offset across the upstream direction with the second plurality of collector plates.

19. The electrostatic precipitator of claim 15, further comprising Photocatalytic Oxidation section having a UVC light downstream of the first collector section.

20. The electrostatic precipitator of claim 19, further comprising a sorbent of hydrophobic synthetic zeolite sorbent configured for capturing gaseous emissions or a blend of hydrophobic synthetic zeolite with activated charcoal being located downstream of the second collector section.

* * * * *